US012758994B2

(12) United States Patent
Feldhaus et al.

(10) Patent No.: US 12,758,994 B2
(45) Date of Patent: Oct. 13, 2026

(54) METHOD FOR PRODUCING A SPRAY NOZZLE DEVICE, IN PARTICULAR FOR SPRAYING A CASTING STRAND DURING CASTING OF METALLIC PRODUCTS, AND A SPRAY NOZZLE DEVICE

(71) Applicant: SMS Concast AG, Zurich (CH)

(72) Inventors: Stephan Feldhaus, Uster (CH); Nina Uppenkamp, Viersen (DE); Robert Burgfeld, Bergheim (DE); Tobias Brune, Willich (DE); Roland Hafliger, Hergiswil (CH); Marcel Meier, Bellikon (CH); Steve Munch, Zurich (CH)

(73) Assignee: SMS Concast AG, Zurich (CH)

( * ) Notice: Subject to any disclaimer, the term of this patent is extended or adjusted under 35 U.S.C. 154(b) by 313 days.

(21) Appl. No.: 18/331,238

(22) Filed: Jun. 8, 2023

(65) Prior Publication Data

US 2023/0405617 A1 Dec. 21, 2023

(30) Foreign Application Priority Data

Jun. 15, 2022 (EP) .................................... 22179202

(51) Int. Cl.
*B05B 7/04* (2006.01)
*B22D 11/124* (2006.01)
*B33Y 80/00* (2015.01)

(52) U.S. Cl.
CPC ........ *B05B 7/0483* (2013.01); *B22D 11/1246* (2013.01); *B33Y 80/00* (2014.12)

(58) Field of Classification Search
CPC .... B05B 7/0483; B33Y 80/00; B22D 11/1246
USPC .......................................................... 239/398
See application file for complete search history.

(56) References Cited

U.S. PATENT DOCUMENTS

| | | | | |
|---|---|---|---|---|
| 4,116,382 A | 9/1978 | Clerk | | |
| 4,343,434 A | 8/1982 | Haruch | | |
| 4,349,156 A * | 9/1982 | Haruch | B05B 1/042 | 239/432 |
| 4,591,099 A * | 5/1986 | Emory | B05B 1/042 | 239/419 |

(Continued)

OTHER PUBLICATIONS

WO2016055115. English translation by Google Patents (Year: 2016).*
EP2698210A1 English by Google Patents (Year: 2014).*

*Primary Examiner* — Chee-Chong Lee
(74) *Attorney, Agent, or Firm* — Brian Roffe

(57) ABSTRACT

In a method for producing a spray nozzle device, in particular for spraying a casting strand during casting of metallic products, the spray nozzle device includes a basic body with an air inlet, a water inlet and a nozzle body with a mixing chamber for producing an air/water mixture which emerges through at least one nozzle outlet. The air inlet is formed by at least one air inlet nozzle, with a nozzle tip projecting into the mixing chamber, and has at least one air outlet hole. The water inlet opens into the mixing chamber close to the nozzle tip of the air inlet through at least one water outlet hole oriented transversely to a longitudinal axis of the mixing chamber. At least one part region of the spray nozzle device is produced by a generative production process, preferably operating as a 3D printing process.

18 Claims, 2 Drawing Sheets

(56) References Cited

U.S. PATENT DOCUMENTS

| | | | | |
|---|---|---|---|---|
| 4,793,554 | A * | 12/1988 | Kraus | F25C 3/04<br>239/14.2 |
| 6,352,639 | B2 | 3/2002 | Ito et al. | |
| 6,705,538 | B2 | 3/2004 | Fecht et al. | |
| 7,552,881 | B2 | 6/2009 | Lipthal | |
| 8,631,854 | B2 * | 1/2014 | Dratva | B22D 11/1248<br>164/486 |
| 8,820,663 | B2 | 9/2014 | Vidusek | |
| 9,470,449 | B2 | 10/2016 | Lehner et al. | |
| 10,286,446 | B2 | 5/2019 | Kuster et al. | |
| 2001/0000600 | A1 * | 5/2001 | Ito | B05B 7/0483<br>208/113 |
| 2001/0043888 | A1 * | 11/2001 | Ito | F23D 11/106<br>422/139 |
| 2002/0134862 | A1 * | 9/2002 | Fecht | B05B 7/10<br>239/432 |
| 2012/0037331 | A1 | 2/2012 | Meier et al. | |

* cited by examiner

METHOD FOR PRODUCING A SPRAY NOZZLE DEVICE, IN PARTICULAR FOR SPRAYING A CASTING STRAND DURING CASTING OF METALLIC PRODUCTS, AND A SPRAY NOZZLE DEVICE

FIELD OF THE INVENTION

The invention relates to a method for producing a spray nozzle device, which can be used in particular for spraying a casting strand during the casting of metallic products, wherein the spray nozzle device includes a basic body with an air inlet and a water inlet, as well as a nozzle body with a mixing chamber for producing an air/water mixture, which can emerge through at least one nozzle outlet. The air inlet is formed by at least one air inlet nozzle with a nozzle tip projecting into the mixing chamber, and is provided there with at least one air outlet hole, while the water inlet opens into the mixing chamber close to the nozzle tip of the air inlet through at least one water outlet hole oriented transversely to the longitudinal axis of the mixing chamber.

BACKGROUND OF THE INVENTION

Spray nozzles of this kind are known in continuous casting plants for cooling a casting strand during casting, or used for other cooling applications, for example in rail hardening. In this situation, the most uniform cooling effect possible of the cooling jet being emitted is striven for in order to avoid, inter alia, the risk of cracks forming in the hot casting strand during the cooling process. For technical processing reasons, or due to the respective dimensions and/or the geometry of the format being cast, the cooling effect required will differ. As a result, it is necessary for the dimensioning and configuration of the spray nozzles to be adapted to the respective operational conditions, which is an elaborate procedure in terms of manufacturing technology and increases manufacturing costs.

A spray nozzle device of the type referred to is described in EP 2 698 210, which corresponds to U.S. Pat. No. 10,286,446 incorporated by reference herein, wherein an inlet is formed by an air inlet nozzle with a region projecting into the mixing chamber. At least one air outlet hole is provided, which exhibits an angle of approximately 90 degrees in relation to a longitudinal axis of the mixing chamber. Water inlet takes place through at least one hole close to the tip of the air inlet and oriented transversely to the longitudinal axis of the mixing chamber. The production of the spray nozzle takes place in the conventional manner by chip-removing machining of a casting or workpiece. This requires the provision of a relatively voluminous shape of the casting, and relatively elaborate production.

OBJECTS AND SUMMARY OF THE INVENTION

The invention is based on the object of alleviating these disadvantages and providing a method for producing a spray nozzle device of the type referred to previously, which allows for simple and economical production with savings on material and for the configuration of the spray nozzle device in such a way that an optimized air/water mixture in the mixing chamber, with low media delivery and restricted spatial conditions, allows for an extremely uniform spray effect to be produced on the strand surface or on other objects.

This object is solved according to the invention in that at least the part region of the spray nozzle device, including the air inlet nozzle with the at least one air outlet hole and/or the water inlet with the at least one water outlet hole, is preferably produced by a generative manufacturing process operating preferably as a three-dimensional (3D) printing process.

As a result, the air inlet with the nozzle tip and the water inlet with the at least one water outlet hole are configured in such a way that this optimized air/water mixture can be produced in the mixing chamber, and the spray effect is maximized. Accordingly, the manufacturing process of the spray nozzle device can be simplified with regard to production technology in that it is produced at least in a part region with the additive manufacturing process.

In addition to this, the elaborate manufacturing procedure with the chip-removing machining of the blank, can be done away with. The proposed method further allows fora space-saving configuration of the mixing chamber of the nozzle body such that a substantially more compact structural design is achieved. Further advantages are a reduction in the consumption of air and water, an improvement in product quality due to better cooling of the product, and longer service life, which is made possible by the configuration of the spray nozzle device.

It is advantageous in this situation if the spray nozzle device according to the invention is composed of a flat basic body containing the air inlet and the water inlet with a plate-shaped cover and a cylindrical nozzle body forming the mixing chamber, with the nozzle outlet for the air-water mixture.

Since, as a rule, the cylindrical nozzle body only requires little machining, it is often advantageous if only the basic body and/or the plate-shaped cover are produced by the generative manufacturing process, preferably as a single-piece structural unit. It is nevertheless possible, within the framework of the invention, without further ado, for the nozzle body also to be produced by the generative manufacturing process, if appropriate as a single piece with the basic body and the cover. It would also be possible in each case for only the basic body or the plate-shaped cover to be produced generatively.

For the purpose of a compact structure, it is advantageous if the air inlet and the water inlet open into the mixing chamber in a plane transverse to its longitudinal axis, running at approximately the same height.

It is also advantageous if the spray nozzle device comprises two or more diametrically opposed water inlet channels leading into the mixing chamber, which run transversely to the longitudinal axis of the mixing chamber and are also formed in the basic body and the cover with their contact surfaces facing one another.

The invention further makes provision for air outlet holes to be formed in the nozzle tip in the form of a star, running transversely to the longitudinal axis of the mixing chamber. It is advantageous in this situation if the water outlet holes of the nozzle are guided radially into the mixing chamber, in each case between two of the plurality of air outlet holes. In this way, it is possible for the intermixing of air and water in the chamber to be improved.

Based on the conditions prevailing in the casting plant, the invention also makes provision for the spray nozzle to be preferably manufactured from stainless steel. It would also be possible, however, for other materials with similar properties to be used, such as brass.

BRIEF DESCRIPTION OF THE DRAWINGS

The invention and its further advantages are explained in greater detail hereinafter on the basis of exemplary embodiments and making reference to the drawings. These show.

DETAILED DESCRIPTION OF THE INVENTION

Figure 1:
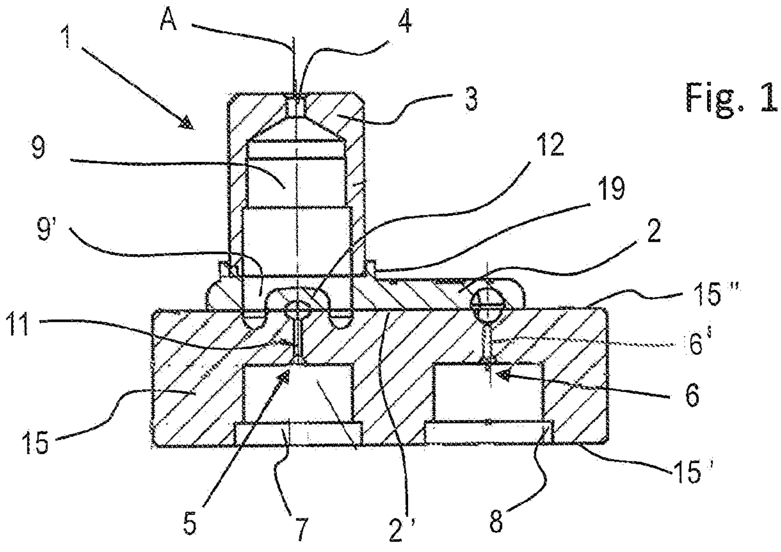
FIG. 1 is a longitudinal section of a spray nozzle device according to the invention.

A spray nozzle device 1 shown in FIGS. 1-4 serves in particular to spray a casting strand during drawing off from a die in a conventional continuous casting plant, which is used to produce metallic products. Other cooling applications for manufactured metal products are also possible, however, such as rail hardening, or the spray nozzle devices, arranged in rows, could further be used with cast metallic products or after the extraction of standing strands, for example with vertical casting plants or the like.

The spray nozzle device 1 comprises a disk-shaped basic body 15, connecting to this a plate-shaped cover 2 and a cylindrical nozzle body 3, with at least one spray nozzle outlet 4 for the air-water mixture. The basic body 15 comprises an air inlet 5 and a water inlet 6, with connection holes 7, 8 arranged next to one another, in each case for the delivery of air and water respectively, not shown.

Formed in the nozzle body 3 is a likewise cylindrical mixing chamber 9, and centrally the spray nozzle outlet 4. Opposite this, a nozzle tip 12 of the basic body 15 projects in a mixing chamber 9, by which a ring-shaped chamber inlet 9' (i.e., an annular chamber inlet) of the mixing chamber 9 is formed, which is formed between contact surfaces 15", 2', facing one another, of the basic body 15 and the cover 2. The spray nozzle outlet 4 for the air-water mixture could also be provided with several outlets. For the cover 2, a projecting flange 19 is formed, in which the nozzle body 3 is secured and centered such that it extends coaxially to the nozzle tip 12 and the ring-shaped chamber inlet 9'.

Figure 2:
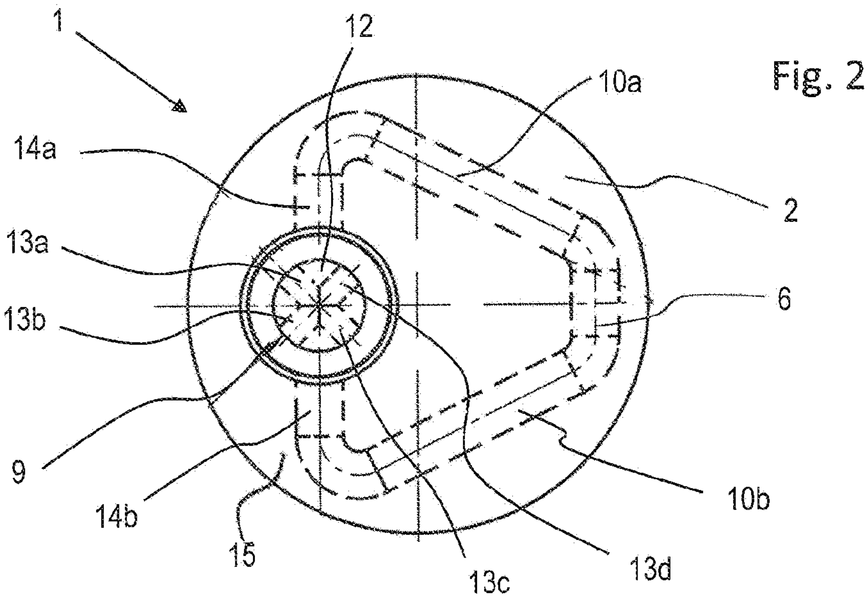
FIG. 2 is a view from above of a cover of the spray nozzle device according to FIG. 1.
Figure 3:
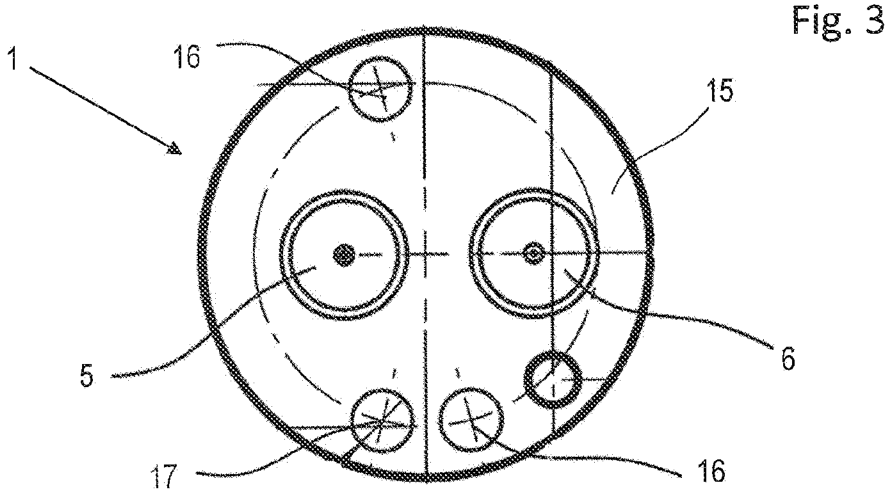
FIG. 3 is a view from below of the spray nozzle device according to FIG. 1.

According to the invention, assigned to the water inlet 6 are two water inlet channels 10*a*, 10*b*, arranged diametrically opposed in the chamber inlet 9', leading into the mixing chamber 9, which open into the mixing chamber 9 on a plane transverse to its longitudinal axis A at approximately the same height, and, as can be seen in FIG. 2 and FIG. 3, also open between the basic body 15 and the cover 2, with their contact surfaces 15", 2' running towards one another. The air inlet 5 is in turn formed by an air inlet nozzle 11, of which the nozzle tip 12, projecting into the mixing chamber 9, is provided with four star-shaped air outlet holes 13*a*, 13*b*, 13*c* and 13*d*.

The water inlet channels 10*a*, 10*b*, connected to the at least one water supply line 6', open close to the nozzle tip 12 into water outlet holes 14*a*, 14*b*, oriented transversely to the longitudinal axis A of the mixing chamber 9, which are guided radially into the mixing chamber, in each case between two of the four air outlet holes 13*a*-13*d*. In this situation, the water inlet channels 10*a*, 10*b* are guided, starting from the water inlet 6, in each case in a curved manner in the cover 2 in such a way that they open from outside radially into the mixing chamber 9.

It is of course possible for both the number of the air outlet holes as well as of the water outlet holes to vary, wherein, in each case, only one or also several could be provided.

Preferably, the water inlet channels 10*a*, 10*b*, and the water outlet holes 14*a*, 14*b*, and the air outlet holes 13*a*-13*d*, are oriented approximately perpendicular to the longitudinal axis A of the mixing chamber 9. Within the framework of the invention, however, they can also be guided slightly inclined to the longitudinal axis. Likewise, these connection holes for the water and/or the air can also be provided laterally in the nozzle body 3.

These water inlet channels 10*a*, 10*b*, seen in cross-section, are formed half in the basic body 15 and half in the cover 2. They could, however, also be provided only or partially in one or the other.

The nozzle body 3 with the spray nozzle outlet 4 is arranged coaxially to the air inlet 5 and the nozzle tip 12 in the basic body 15, while the water inlet 6 is oriented parallel to the air inlet 5, and is connected by the water inlet channels 10*a*, 10*b* leading into the chamber inlet 9' of the mixing chamber 9. Preferably, both the nozzle body 3, and with it the air inlet 5 and the nozzle tip 12, as well as the water inlet 6, are arranged at a distance from the center of the basic body 15. Among other advantages, this allows for the compactness of the spray nozzle.

According to FIG. 3, holes 16, 17 are provided in the basic body 15, which serve to install the spray nozzle device 1. During assembly, the face side 15' of the basic body 15 is attached to a structure, the basic body 15 is secured to this, and the lines are connected.

During the production process of the spray nozzle device 1, according to the invention at least one part region of the basic body 15 and of the cover 2, which comprises the air inlet nozzle 11, projecting into the mixing chamber 9, with the air inlet holes 13*a*-13*d*, and the water inlet 6 with the water inlet channels 10*a*, 10*b* and the water outlet holes 14*a*, 14*b*, is preferably produced by a generative production process operating as a 3D printing process.

With this three-dimensional printing process, the part which is to be produced is created layer by layer with powder and then, by laser welding with selective laser melting (SLM) or selective laser sintering (SLS) and/or similar as the printing process. In the present exemplary embodiment, this is carried out in such a way that the basic body 15 and the plate-shaped cover 2 are produced as one piece by the generative production process. The cylindrical nozzle body 3 is produced in a conventional manner due to the otherwise low processing effort and expenditure. It is likewise possible for the nozzle body 3 to be produced separately or monolithically with the basic body 15 and the cover 2, or also all three parts to be produced as separate components or monolithically in accordance with the generative production process.

By means of this 3D printing process, the manufacturing costs are reduced which would otherwise be incurred by chip-removing machining. In addition, material losses are largely avoided, and the advantages of the compact structural design are exploited in respect of savings in material and weight.

Figure 4:
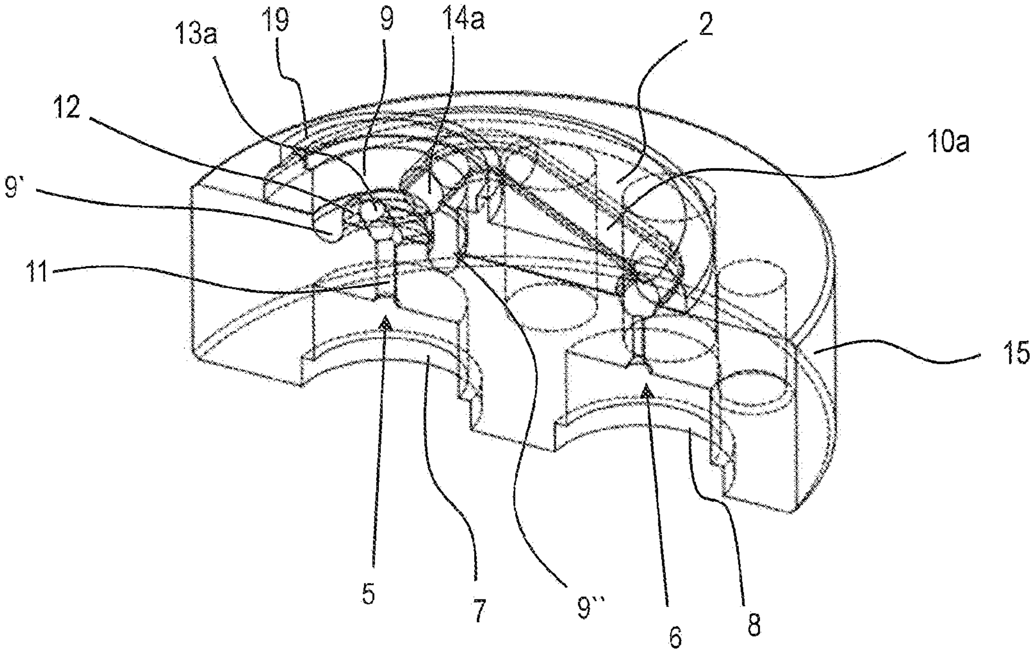
FIG. 4 is a perspective partial longitudinal section of the spray nozzle device without the nozzle body.

FIG. 4 shows the spray nozzle device 1 without the nozzle body 3 and with the basic body 15, the cover 2 connecting to this in a partial sectional view, and the projecting flange 19 for receiving the nozzle body 3. In the basic body 15, there can be seen the air inlet 5 and the water inlet 6 with the connection holes 7, 8 arranged next to one another for the air and water supplies, not represented. Also shown is the ring-shaped chamber inlet 9' of the mixing chamber 9, configured with a lower ring surface 9", semicircular in cross-section. As indicated previously, the water inlet channels 10*a*, 10*b* are guided, starting from the water inlet 6, in case in a curved manner in the cover 2, and conducted radially into the mixing chamber 9.

The invention is adequately described by the exemplary embodiment presented. As a variant, the basic body 15 and the nozzle body 3 could be provided with other external shapes. It would also be possible for only one water inlet or, if required, for more than two of them to be integrated. The basic body 15 and the cover 2 could be produced as one part. Likewise, the nozzle tip 12 could be shaped other than represented, and provided with only one or two air outlet holes, arranged for example radially.

The generative manufacturing process for at least one part of the spray nozzle device 1 can be varied. Accordingly, the basic body 15 and/or the nozzle body 3 or parts thereof are produced by the Binder Jetting 3D printing process.

At least one of the inventions disclosed herein is not limited to the above embodiments and should be determined by the following claims. There are also numerous additional applications in addition to those described above. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the following claims.

The invention claimed is:

1. A method for producing a spray nozzle device, comprising:

providing a basic body with an air inlet, and a water inlet, the air inlet including at least one air inlet nozzle having a nozzle tip, the nozzle tip including at least one air outlet hole, the water inlet including at least one water inlet channel and a respective water outlet hole for each of the at least one water inlet channel, providing a separate nozzle body with a longitudinally extending mixing chamber for producing an air/water mixture from air receivable via the air inlet and water receivable via the water inlet and which air/water mixture operatively emerges through at least one nozzle outlet of the nozzle body, the mixing chamber having a longitudinal axis, coupling the nozzle body and the basic body such that the nozzle tip projects into the mixing chamber, forming the basic body such that when the nozzle body and the basic body are coupled, each of the respective water outlet hole is oriented transversely to the longitudinal axis of the mixing chamber and opens into the mixing chamber close to the nozzle tip, producing part of the spray nozzle device by means of a generative production process operating as a three-dimensional printing process, the part of the spray nozzle device comprising the nozzle tip with the at least one air outlet hole and the water inlet with the respective water outlet hole, and a cover alongside the basic body, and forming the basic body and the cover with contact surfaces that define therebetween the at least one water inlet channel.

2. The method of claim 1, wherein the part of the spray nozzle device produced by the generative production process operating as a three-dimensional printing process further comprises the nozzle body.

3. The method of claim 1, wherein the step of producing the part of the spray nozzle device comprises forming the part of the spray nozzle device using one of a selective laser melting (SLM), selective laser sintering (SLS), or Binder Jetting three-dimensional printing process.

4. The method of claim 1, wherein the nozzle body is cylindrical and the mixing chamber is cylindrical, further comprising forming the at least one nozzle outlet at an end region of the mixing chamber opposite an end region at which the nozzle tip projects into the mixing chamber.

5. The method of claim 1, wherein the at least one nozzle outlet consists of a single nozzle outlet, further comprising forming the single nozzle outlet at one end region of the nozzle body, and wherein the mixing chamber is open at an opposite end region of the nozzle body where the nozzle tip projects into the mixing chamber.

6. The method of claim 1, further comprising forming the basic body and cover to define therebetween an annular chamber inlet that opens to the mixing chamber and that is around the nozzle tip.

7. The method of claim 6, further comprising forming the nozzle body such that when the nozzle body and the basic body are coupled, the nozzle body extends coaxially to the nozzle tip and the annular chamber inlet.

8. The method of claim 6, further comprising forming each of the at least one water inlet channel to open in a radial direction into the annular chamber inlet.

9. The method of claim 1, further comprising forming the nozzle body such that when the nozzle body and the basic body are coupled, the nozzle body extends coaxially to the nozzle tip.

10. A spray nozzle device, comprising:

a basic body with an air inlet, and a water inlet, the air inlet including at least one air inlet nozzle having a nozzle tip, the nozzle tip including at least one air outlet hole, the water inlet including water inlet channels and a respective water outlet hole for each of the water inlet channels, a cover alongside the basic body, and a separate nozzle body with a longitudinally extending mixing chamber for producing an air/water mixture from air receivable via the air inlet and water receivable via the water inlet and which air/water mixture operatively emerges through at least one nozzle outlet of the nozzle body, the mixing chamber having a longitudinal axis, the nozzle body and the basic body being coupled such that the nozzle tip projects into the mixing chamber, the basic body being configured such that when the nozzle body and the basic body are coupled, each of the respective water outlet hole is oriented transversely to the longitudinal axis of the mixing chamber and opens into the mixing chamber close to the nozzle tip, the nozzle tip and the cover being produced by means of a generative production process operating as a three-dimensional printing process, wherein the cover is between the basic body and the nozzle body, the basic body and the cover including contact surfaces that face towards one another and define therebetween the water inlet channels.

11. The spray nozzle device of claim 10, wherein the basic body is produced using the generative production process operating as the three-dimensional printing process.

12. The spray nozzle device of claim 10, wherein the at least one air outlet hole and each of the respective water outlet hole open into the mixing chamber on a common plane transverse to the longitudinal axis of the mixing chamber.

13. The spray nozzle device of claim 10, wherein the water inlet channels include two diametrically opposed water inlet channels, directed into the mixing chamber, which run transversely to the longitudinal axis of the mixing chamber.

14. The spray nozzle device of claim 10, wherein the air inlet further comprises air outlet holes running transversely to the longitudinal axis of the mixing chamber and which are in the nozzle tip, the air outlet holes each being connected at an inner end to the air inlet and extending radially outward therefrom.

15. The spray nozzle device of claim 10, wherein the at least one water outlet hole consists of two water outlet holes that open radially into the mixing chamber, the at least one air outlet hole consisting of four air outlet holes, each of the two water outlet holes being arranged between a respective two of the four air outlet holes.

16. The spray nozzle device of claim 10, wherein the nozzle body with the at least one nozzle outlet is arranged coaxially to the air inlet and the nozzle tip in the basic body, and the water inlet is aligned parallel to the air inlet, and is connected by the water inlet channels leading into a chamber inlet of the mixing chamber.

17. The spray nozzle device of claim 10, wherein at least one of the basic body, the cover, and the nozzle body is made of stainless steel or brass.

18. The spray nozzle device of claim 10, wherein the spray nozzle device is configured for spraying a casting strand during casting of metallic products.

* * * * *